United States Patent [19]
Naville et al.

[11] Patent Number: 5,372,207
[45] Date of Patent: Dec. 13, 1994

[54] SEISMIC PROSPECTING METHOD AND DEVICE USING A DRILL BIT WORKING IN A WELL

[75] Inventors: Charles Naville, Grigny; Philippe Staron, Mennecy; Guy Pignard; Christian Wittrisch, both of Rueil-Malmaison, all of France

[73] Assignee: Institut Francais du Petrole, Rueil Malmaison, France

[21] Appl. No.: 174,400

[22] Filed: Dec. 28, 1993

[30] Foreign Application Priority Data

Dec. 29, 1992 [FR] France ................. 92 15986

[51] Int. Cl.$^5$ ............................................ E21B 47/00
[52] U.S. Cl. ............................................ 175/1; 175/40
[58] Field of Search .................. 175/1, 40, 45, 48, 50

[56] References Cited

U.S. PATENT DOCUMENTS

| | | | |
|---|---|---|---|
| 3,979,140 | 9/1976 | Silverman et al. | 175/1 X |
| 3,979,724 | 9/1976 | Silverman et al. | 175/1 X |
| 4,252,210 | 2/1981 | Sodich | 175/1 X |
| 4,474,250 | 10/1984 | Dardick | 175/1 |
| 4,926,391 | 5/1990 | Rector et al. | |
| 4,965,774 | 10/1990 | Ng et al. | |

FOREIGN PATENT DOCUMENTS 2564980 11/1985 France .

*Primary Examiner*—Michael Powell Buiz
*Attorney, Agent, or Firm*—Antonelli, Terry, Stout & Kraus

[57] ABSTRACT

The method consists in performing seismic prospecting operations by using a drill bit (1) working at the bottom of a well (2), which generates very powerful acoustic jogs, in transmitting in real time or in delayed time reference signals representative of the jogs of the drill bit picked up in the immediate vicinity thereof by bottomhole sensors and in correlating the seismic signals picked up by a reception set with the reference signals coming from the bottom. The reference signals may be transmitted to the surface station through a line (4) included in a drill string (3). Absorbing elements are preferably interposed on the string to damp the vibrations propagating directly towards the surface along the drill string. Resonant elements and possibly acoustic discontinuity elements favouring resonances in the seismic frequency band may also be interposed.

27 Claims, 8 Drawing Sheets

SEISMIC PROSPECTING METHOD AND DEVICE USING A DRILL BIT WORKING IN A WELL

BACKGROUND OF THE INVENTION

The present invention relates to a seismic prospecting method and device utilizing jogs generated by a drill bit working at the bottom of a well.

According to a commonly used technique, well drilling is achieved by driving, through a motorized rotary table arranged at the surface, a drill column made up of a string of interconnected pipes and provided with a drill bit at the lower end thereof.

Drill bits of this type generate powerful seismic waves and it has been envisaged to use these waves for carrying out measuring operations in the formations crossed by the drill bit during the drilling process and notably seismic prospecting operations (referred to as MWD operations), in order to decrease oil prospecting costs since the wells are not immobilized thereby. However, this type of operations is difficult to implement for many reasons. The amplitude of the jogs produced by a drill bit depends to a large extent on the hardness of the formations crossed. The signals are transmitted permanently by the bit with no possibility of fixing a reference instant. Besides, the frequency spectrum emitted depends on many factors: the type of drill bit used, the rotary speed thereof, the various mechanical elements constituting the drill string, the nature of the formations crossed, etc.

The form and the emission spectrum of the source are generally not well-known because of the distance between the point of emission and the surface station. The jogs are most often picked up by accelerometers arranged in contact with the tubular drill string in the vicinity of the surface after propagating mechanically all along the latter. Moreover, the signals transmitted are strongly distorted by complex resonance and absorption phenomena all along the string and they depend on the structure of the surface installation. As the transfer function of the assembly is not well-known, rigorous references for processing the seismic signals are therefore not available.

Another well-known method consists in fixing a sensor to the base of the drill pipe so as to generate a signal representative of the jogs emitted and for transmitting them to the surface through modulated waves, such as acoustic waves propagating in the fluid contained in the well. Such a method is used when the rate of the data to be transmitted is relatively low, but it is not suitable within the scope of prospecting operations where the volume of acquired signals is high, unless very powerful bottomhole storage means are available.

Interpretation difficulties also appear because the jogs are not emitted only at the level of the drill bit. It has been observed that many locations along the string act as secondary jog sources. This is also the case of the surface drilling platform, which transmits to the formations, through the legs thereof, mechanical energy which propagates along the string and acts therefore also as a secondary jog source.

Implementation examples in this field are described in U.S. Pat. Nos. 4,965,774; 4,926,391; 4,718,048; 4,675,852, etc.

SUMMARY OF THE INVENTION

The method according to the invention allows seismic prospecting operations to be carried out in a formation by making use of the jogs generated by a drill bit connected to a tubular string at the base of a well drilled through the formation. It comprises setting an array of seismic sensors in contact with the formation and connected to a control and acquisition station, for acquiring and recording the seismic signals coming from the formation, and it comprises detecting, in the vicinity of the drill bit, reference signals representative of the jogs generated by the bit and imparted to the formation, transmitting them to said control and acquisition station and performing operations for processing the seismic signals received, such as a correlation of the seismic signals picked up with said reference signals.

If the reference signals and the seismic signals are picked up along several axes, they may be correlated respectively.

The transmission of the reference signals may be achieved by means of a material transmission channel arranged along the tubular string.

According to an advantageous implementation procedure, the method comprises using decoupling means to attenuate the direct propagation, along the tubular string, of the jogs generated by the drill bit, such as string elements provided with elastic shock absorption means adapted for working under traction or compression and interposed on the drill string at a more or less great distance from the drill bit, and selected preferably in order to damp mainly the vibrations whose frequencies are contained in a frequency band useful for seismic prospecting.

The previous procedure may also be improved by using means interposed on the tubular string in the vicinity of the drill bit so as to modify the frequency spectrum emitted by means of resonant element and acoustic discontinuity elements.

According to an embodiment, the method may comprise intensifying on order the jogs generated during drilling.

Application of the method according to the invention allows the exploitation of the seismic data records to be highly simplified because the source used is very powerful, the emission thereof is long and allows therefore a high gain on the signal-to-noise ratio S/B, and above all because the signals produced by the operating bit are perfectly known at any time. Furthermore, when such a source emitting a perfectly defined and located signal is used, the free propagation of the bit vibrations along the string being prevented, many parasitic seismic events may be suppressed and the interpretation of the seismic records obtained may even be facilitated.

As the reference signals are truly representative of the seismic energy transmitted, the method may also include the direct analysis of the reference signals in order to determine the nature of the rocks crossed by the drill bit.

It may also comprise the follow-up of seismic events located by recording the seismic signals received and the determination of the variations in the rate of propagation of the seismic waves in the formations around the well.

The implementing device includes an array of seismic sensors in contact with the formation, a control and acquisition station for acquiring and recording the seismic signals received by the seismic sensors and coming from the formation. It includes sensing means arranged in the vicinity of the drill bit for producing reference signals representative of the jogs generated by the drill bit and imparted to the formation, means for transmitting in real time said reference signals to said control and acquisition station by means, for example, of a transmission channel included in the drill string, or possibly in delayed time, the control and acquisition station including signal processing means such as means for correlating the reference signals with the seismic signals.

The device may include means for picking up several reference signal components and several seismic signal components and, in this case, the control station comprises means for the respective correlating of these signals.

The device preferably includes decoupling means for attenuating the direct propagation, along the tubular string, of the jogs generated by the drill bit.

These decoupling means include for example string elements provided with elastic shock absorption means, preferably adapted for damping mainly the vibrations whose frequencies are contained in a frequency band useful for seismic prospecting.

According to an advantageous embodiment, the device includes means interposed on the tubular string, in the vicinity of the drill bit, for modifying the frequency spectrum emitted by the bit, these means being for example resonant elements likely to resound at frequencies contained in a frequency band useful for seismic prospecting, such as drill collars and/or acoustic discontinuity elements with different acoustic impedances, so as to create reflections and to intensify the resonances generated by the resonant elements in a frequency band useful for seismic prospecting.

If the seismic energy produced is insufficient, it is possible to use a drill bit provided with means for intensifying at will the jogs produced, controlled from the surface through the transmission channel, such as a percussion bit or a drill bit combined with a source of acoustic waves.

BRIEF DESCRIPTION OF THE DRAWINGS

Other features and advantages of the method and of the device according to the invention will be clear from reading the description hereafter of embodiments given by way of non limitative examples, with reference to the accompanying drawings in which.

DESCRIPTION OF THE PREFERRED EMBODIMENTS

Figure 1:
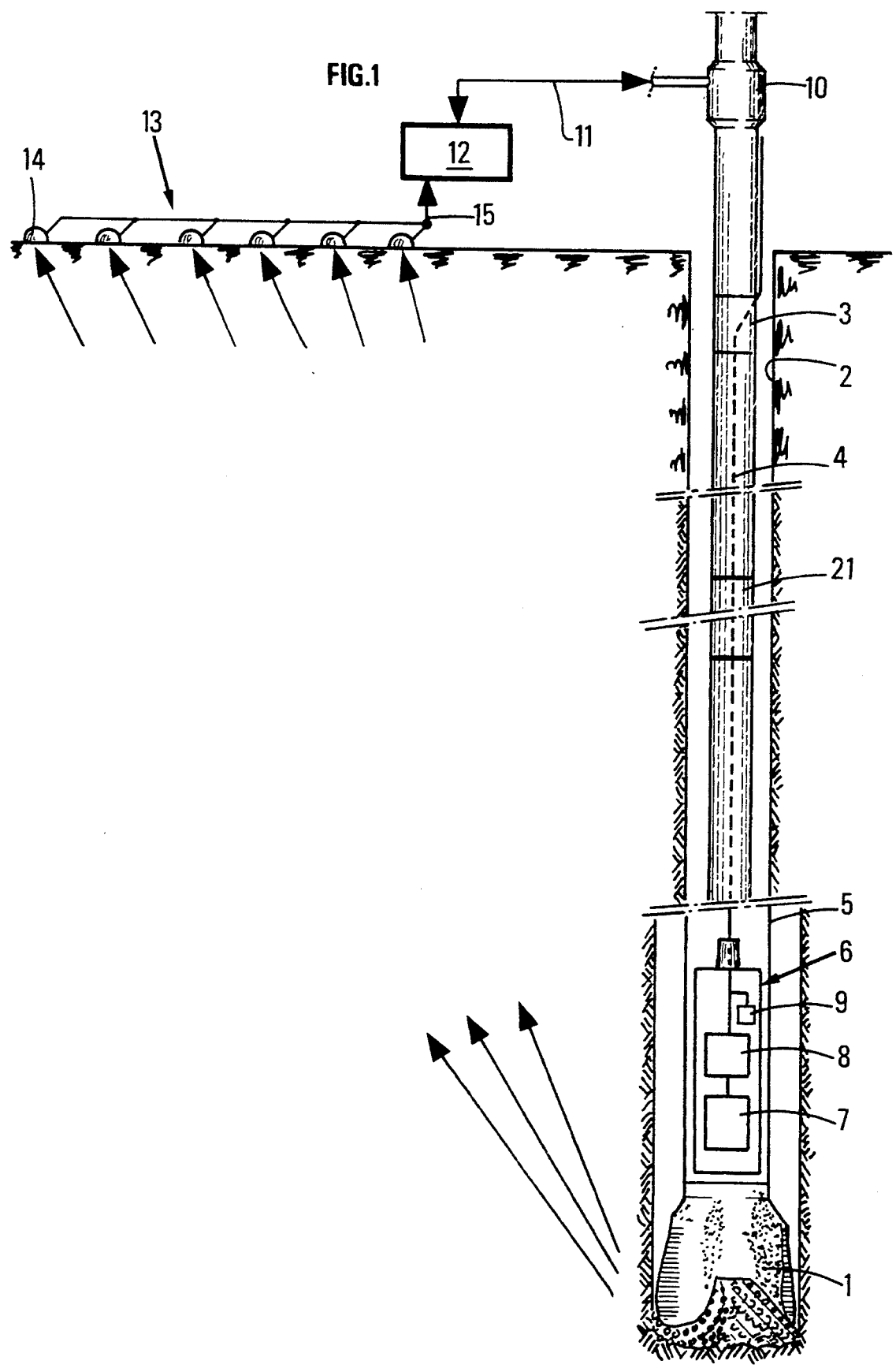
FIG. 1 diagrammatically shows the whole of the device for exploiting the jogs generated by a drill bit at the bottom of a well, FIG. 2 diagrammatically shows the organization of the surface station.

The method according to the invention is implemented by means of a seismic transmission-reception device including a source of seismic jogs consisting of a drill bit 1 progressing in a well 2 and connected to means for driving it in rotation. These means may be conventionally made up of a drill string 3 associated at the surface with motive means (not shown) for driving it in rotation. This drill string 3 is constituted by interconnecting end to end a plurality of tubular sections. String sections such as those described in U.S. Pat. No. 4,806,115 granted to the applicant are preferably used. These sections are inwardly provided with an element of a transmission line 4 and, on each edge side, with piping ends arranged so as to achieve an automatic interconnection of the elements in transmission line 4 when they are connected mechanically to each other.

A housing 6 is arranged inside a drill collar 5 in the vicinity of the drill bit so as to place therein a bottomhole module including measuring instruments and notably sensing means 7 comprising at least one sensor, to produce signals representative of the jogs generated by the operating drill bit. Sensing means 7 include for example one or several accelerometers. It is also possible to use one or several strain gages producing a continuous signal indicative of the weight applied onto the drill bit, and a variable signal analogous to an acceleration signal. The bottomhole module in the same housing 6 also includes an electronic unit 8 adapted to the acquisition of the signals picked up and to the coding thereof for transmitting them on line 4, as well as an electric regulation unit 9 feeding the electronic unit. Line 4 is connected at the surface to a rotating connector 10 connecting it permanently to a line 11 linked to a control station 12. By means of lines 4 and 11, surface station 12 sends electric energy to the regulation unit 9 in the bottomhole module and coded orders. In return, the bottomhole module sends the signals from the various sensors 7 towards station 12 in coded form.

Line 4 may connect permanently the bottomhole module to the rotating connector if a completely cabled drill string is used. It is alo possible to establish temporary composite links for provisional seismic operations by using the equipments decribed in patent applications FR-2 688 027 or 2 688 028 assigned to the same assignee.

According to an embodiment, the sensing means include an accelerometer arranged so as to detect the axial motions of the drillpipe string.

According to another embodiment, the sensing means 7 include two other accelerometers secured with the pipe in rotation. These accelerometers are arranged in a transverse plane of the pipe and orthogonal with respect to each other. Orientation sensors (not shown) are also arranged in housing 6 to determine the orientation of the trihedron formed by the axes of the three accelerometers with respect to a fixed geographic mark. These orientation measurements may be achieved by applying for example the method described in Patent FR-2,670,532 (U.S. application Ser. No. 917,084). The electronic bottomhole module 8 is adapted for coding all the signals produced by the sensing means and for transmitting them to the surface through transmission line 4.

The device according to the invention further includes a set 13 for the reception of the seismic signals propagated in the formation crossed by the wellbore, as a result of the jogs imparted to the formations by the drill bit. This reception set comprises for example, as it is known in the art, a large number of geophones 14 connected through transmission cables 15 to station 12. These geophones may be distributed at the surface according to a one or two-dimensional configuration enabling seismic prospecting operations known as a 3D seismic method to be performed. The reception set may also include, within the scope of offshore drilling operations, one or several seismic streamers towed through the water by ships or laid on the water bottom. The reception set may also include sensors arranged in one or several other wells. The upper part, already cased, of a well under drilling may for example be used to set sensors according to the method described in patent FR-2,593,292 (U.S. patent application Ser. No. 004,554) assigned to the same assignee, where sensors are embedded in the cement injected behind a casing pipe and coupled thereby to the formations crossed.

Figure 2:
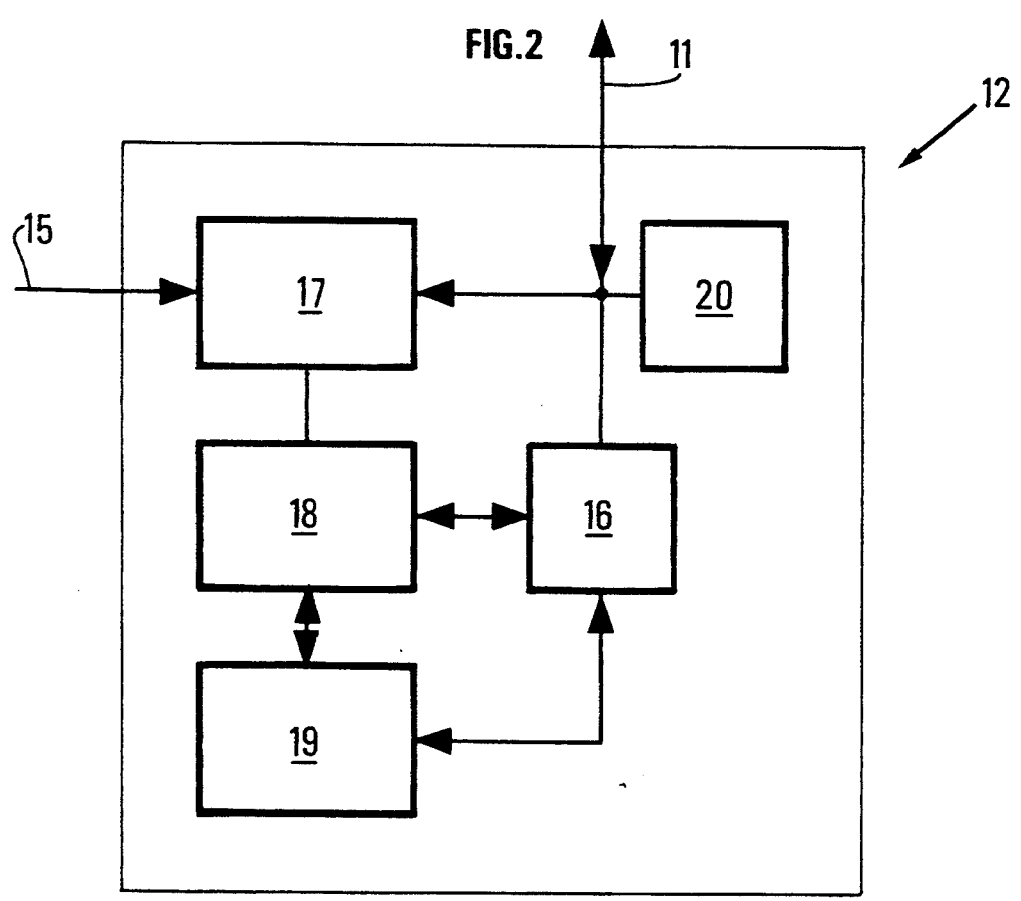
Figure 3:
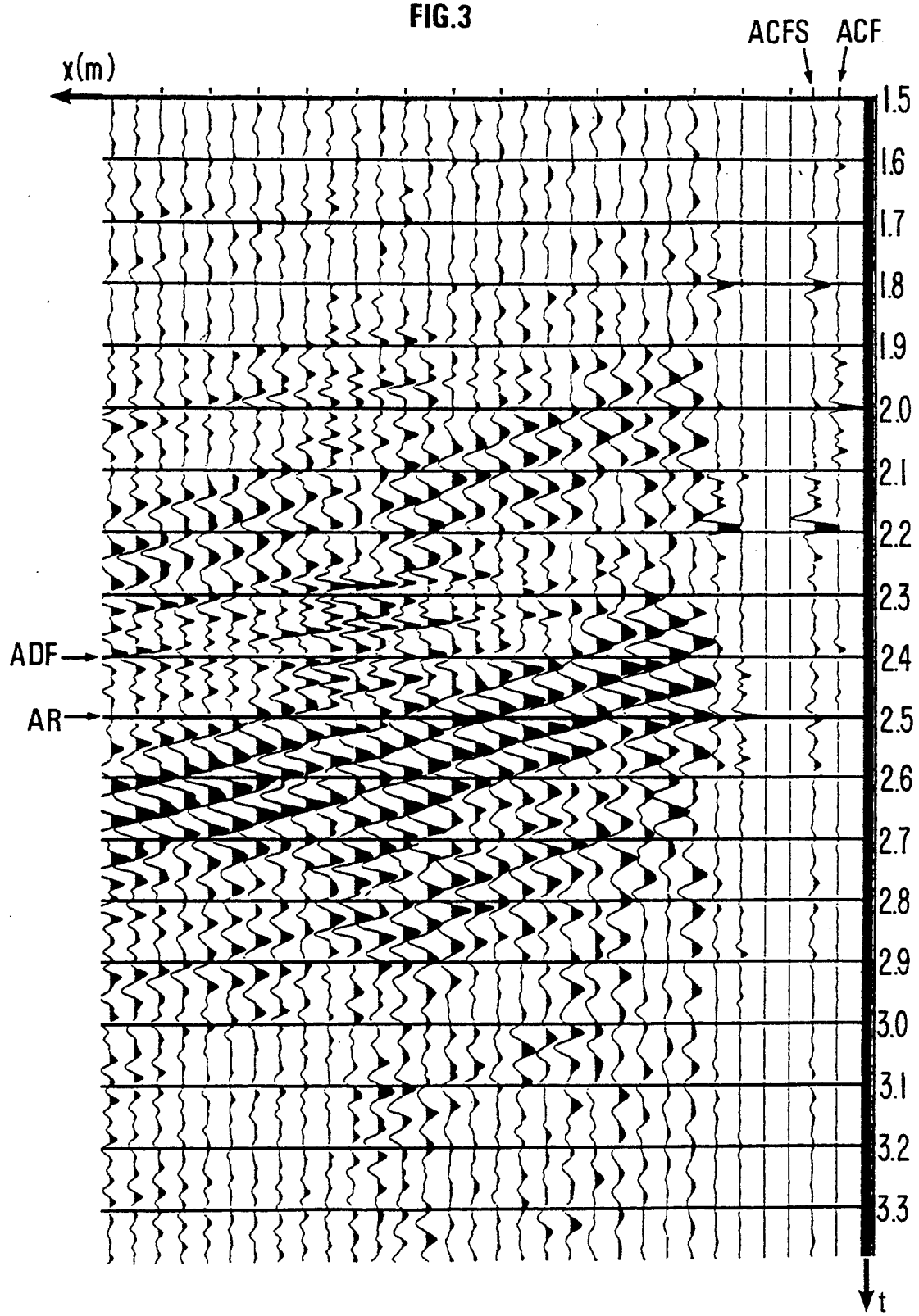
FIGS. 3, 4 show records achieved with a drill bit as a bottomhole source, an array of receivers at the surface, in a plot where x is the lateral distance with respect to the position of the well and t is the propagation time, these records being correlated respectively with a bottomhole accelerometer and with an accelerometer at the top of the drill string.
Figure 4:
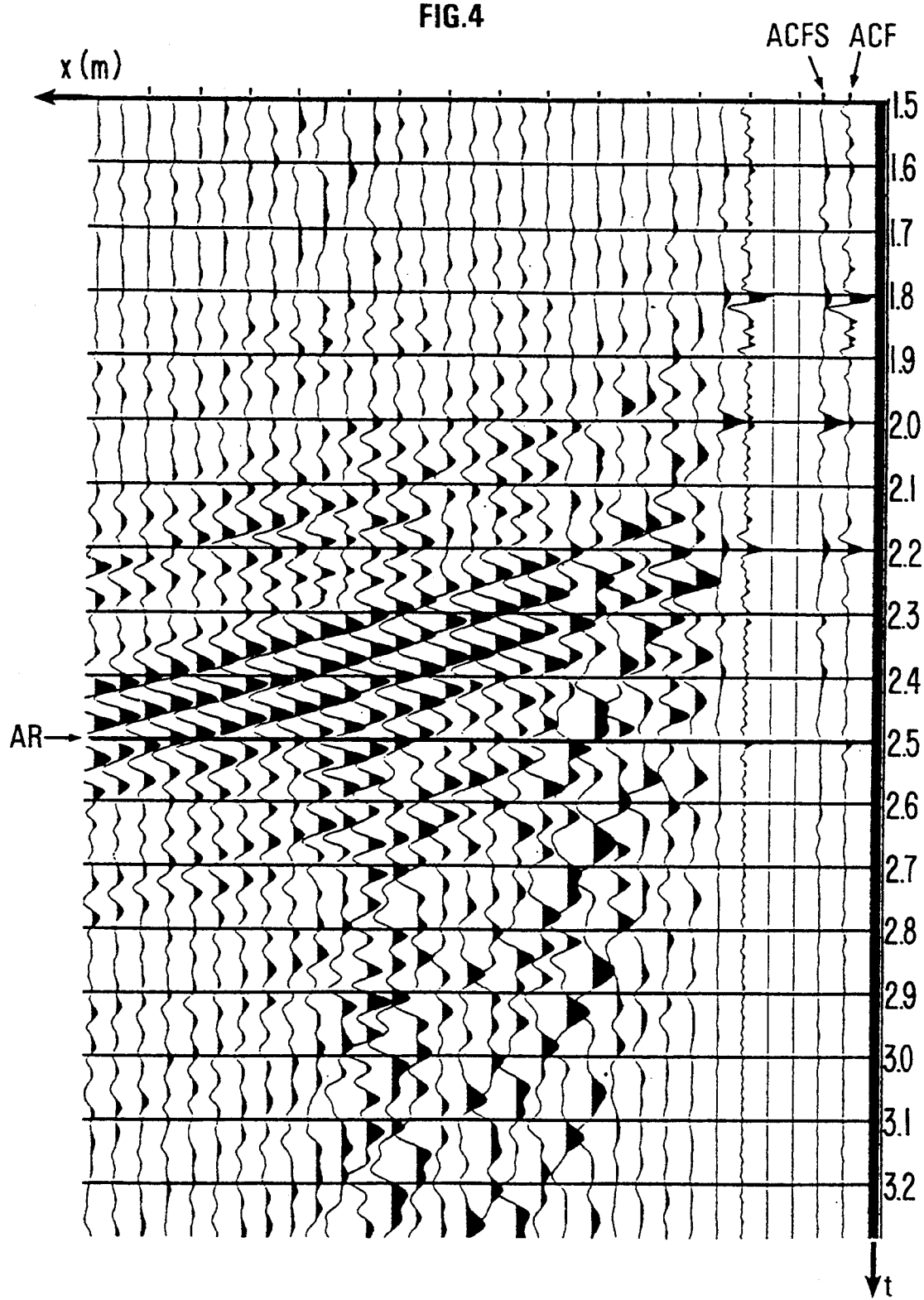

Station 12 includes (FIG. 2) a control computer 16 piloting an acquisition set 17 for acquiring the signals transmitted in real time from the bottom, through lines 4, 11 on the one hand and seismic signals picked up by reception set 13 and transmitted through transmission cables 15 on the other hand, a recording set 18 for recording the signals acquired and a display unit 19. Station 12 also comprises an electric supply module 20 connected to cable 11 and which supplies alternating or direct electric energy thereto.

Control computer 16 may combine the various signals transmitted by the sensing means 7 defined above and determine the components of the acceleration vector.

The method according to the invention mainly consists in:

coordinating and synchronizing the direct acquisition, in real time, by the central station, of the signals generated by the bottomhole sensors and which are accurately representative of the jogs imparted to the formations by the operating drill bit on the one hand and of the signals received by reception set 13 on the other hand, and correlating the signals received with the real jogs which caused them, so as to establish seismic records of the formations crossed by the well.

If the reception system comprises triaxial sensors capable of measuring the components of the seismic signals along three orthogonal axes, the respective components of the seismic signals received and of the acceleration vector are correlated. This operation is particularly justified when shear waves are recorded or to compensate directional effects of the axial emission by the bit, notably in deviated or horizontal wells.

Correlations are preferably achieved in a sufficient time interval distributed on either side of the auto-correlation peak of the signals supplied by the bottomhole sensors, so as to take account of the multiple forerunners, with a view to the later processing of the seismic data recorded.

Experience shows that the results obtained are significantly improved with respect to those obtained with the prior technique where the reference signals were picked up by accelerometers at the top of the drill string, as shown in FIGS. 3 to 8.

Figure 5:
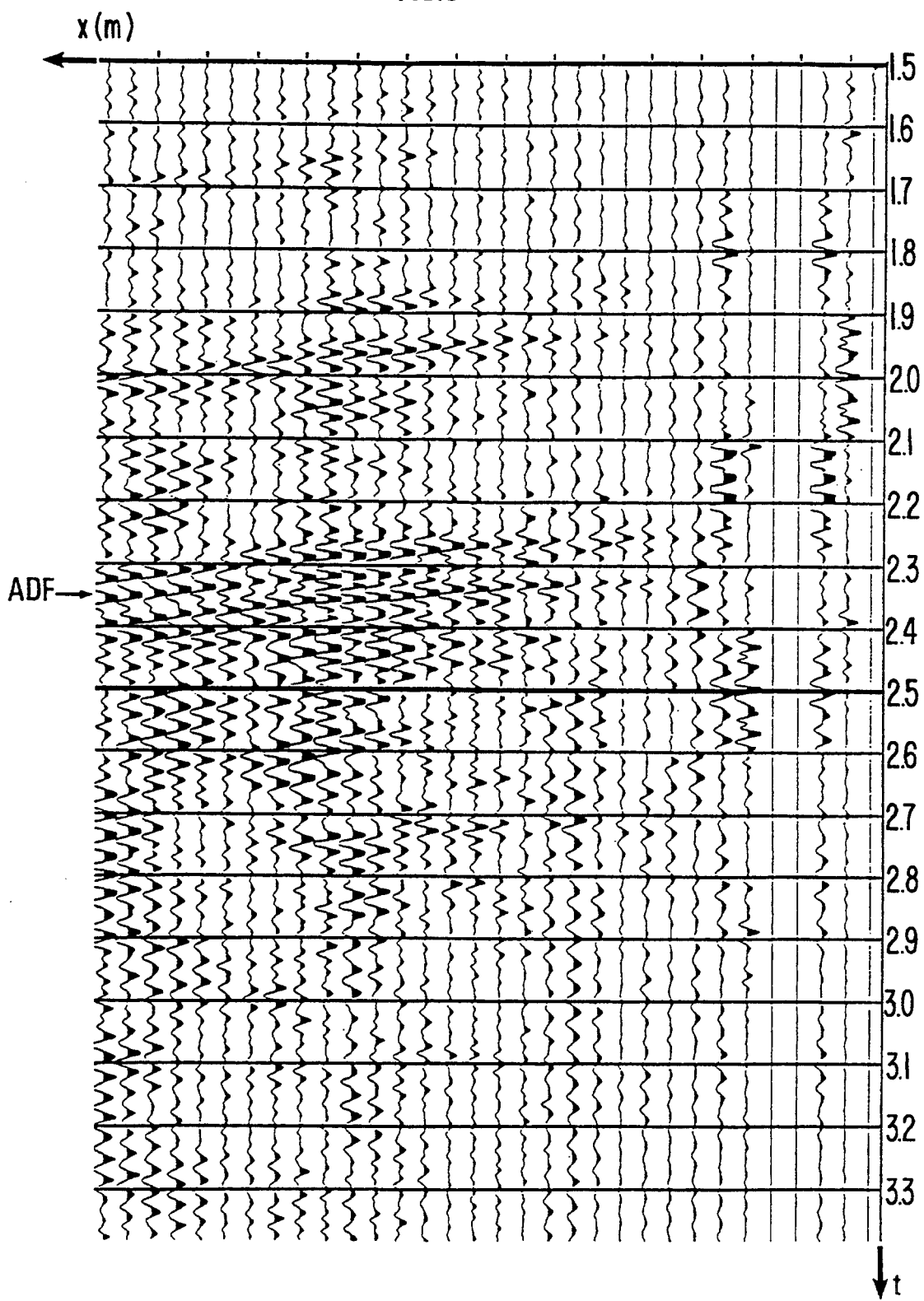
FIGS. 5, 6 show identical records after filtering of the low frequencies.
Figure 6:
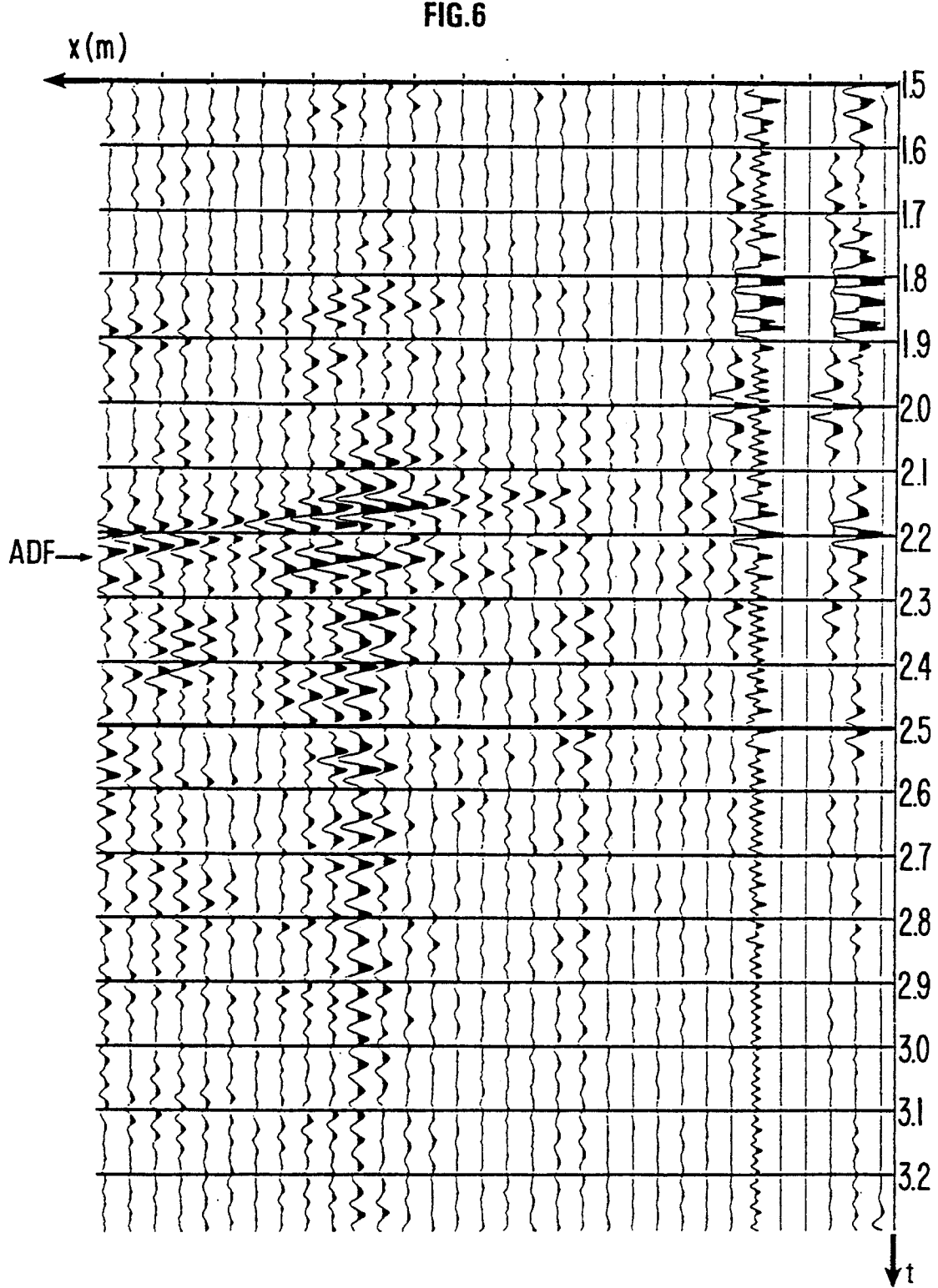

In FIGS. 3 to 6, references ACF and ACFS refer respectively to the auto-correlation of the signal of the bottomhole accelerometer and to the cross-correlation of the signals coming from the accelerometer with those from the accelerometer at the top of the drill string. The direct arrival ADF at the surface of the jogs of the bit may be seen in FIG. 3 (correlation with the bottomhole accelerometer), but not in FIG. 4. The great amplitude of the refracted arrivals AR generated by the vibrations of the derrick in response to the jogs transmitted by the drill string may also be seen. This is due to the fact that the drill string used for recording is not equipped here with the attenuation means 21 mentioned in the previous description. FIG. 5 shows that the direct arrivals from the bottom ADF are more visible when a bottomhole accelerometer is used than in the other case (FIG. 6), where the accelerometer is located at the head of the string. It may also be seen that the frequency content is higher when a bottomhole accelerometer is used to perform correlations.

Figure 7:
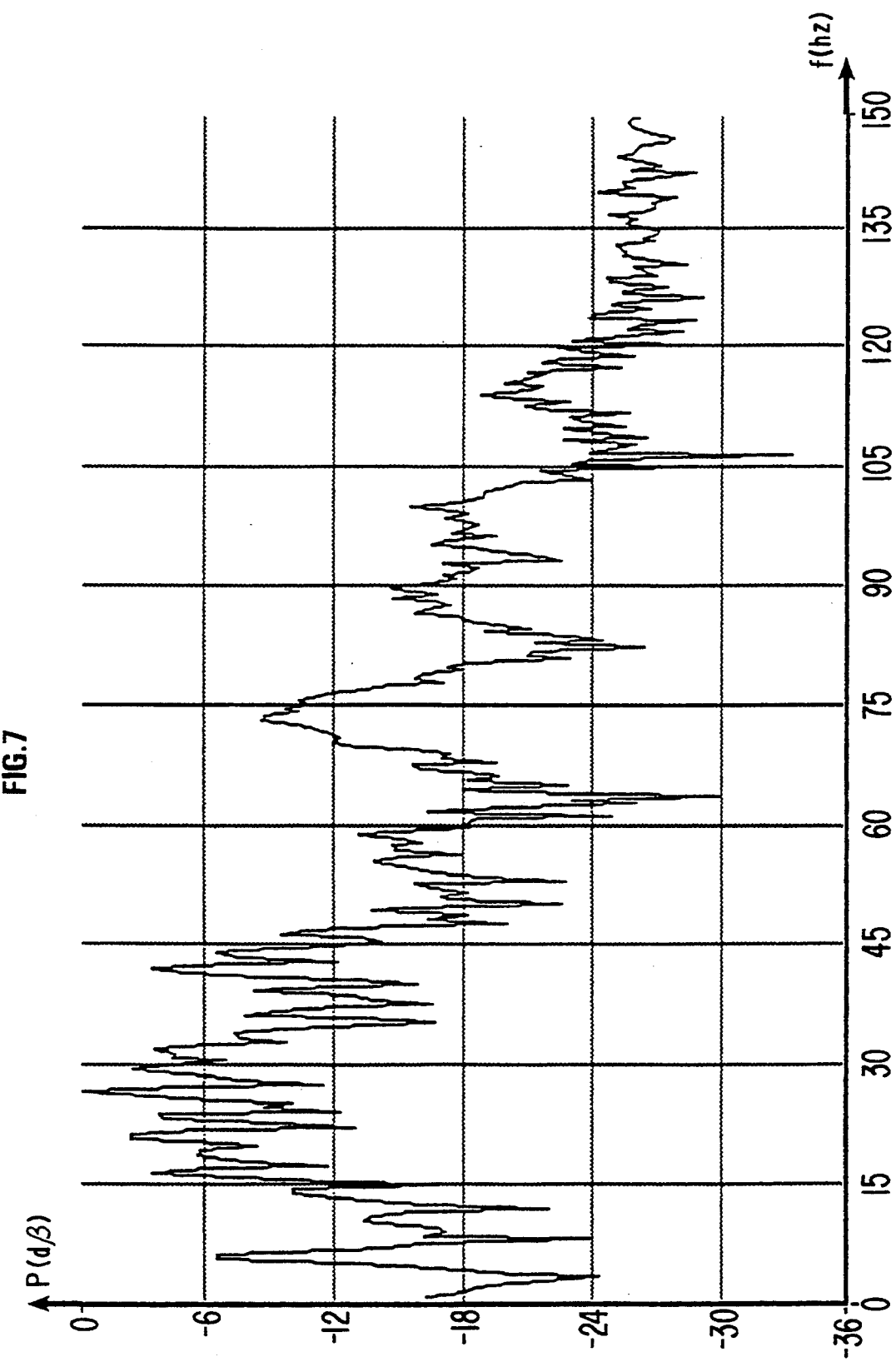
FIGS. 7, 8 show respectively the power spectrum obtained by correlation of the signals of the bottomhole accelerometer and of the string-head accelerometer, and the spectrum measured with the bottomhole accelerometer.
Figure 8:
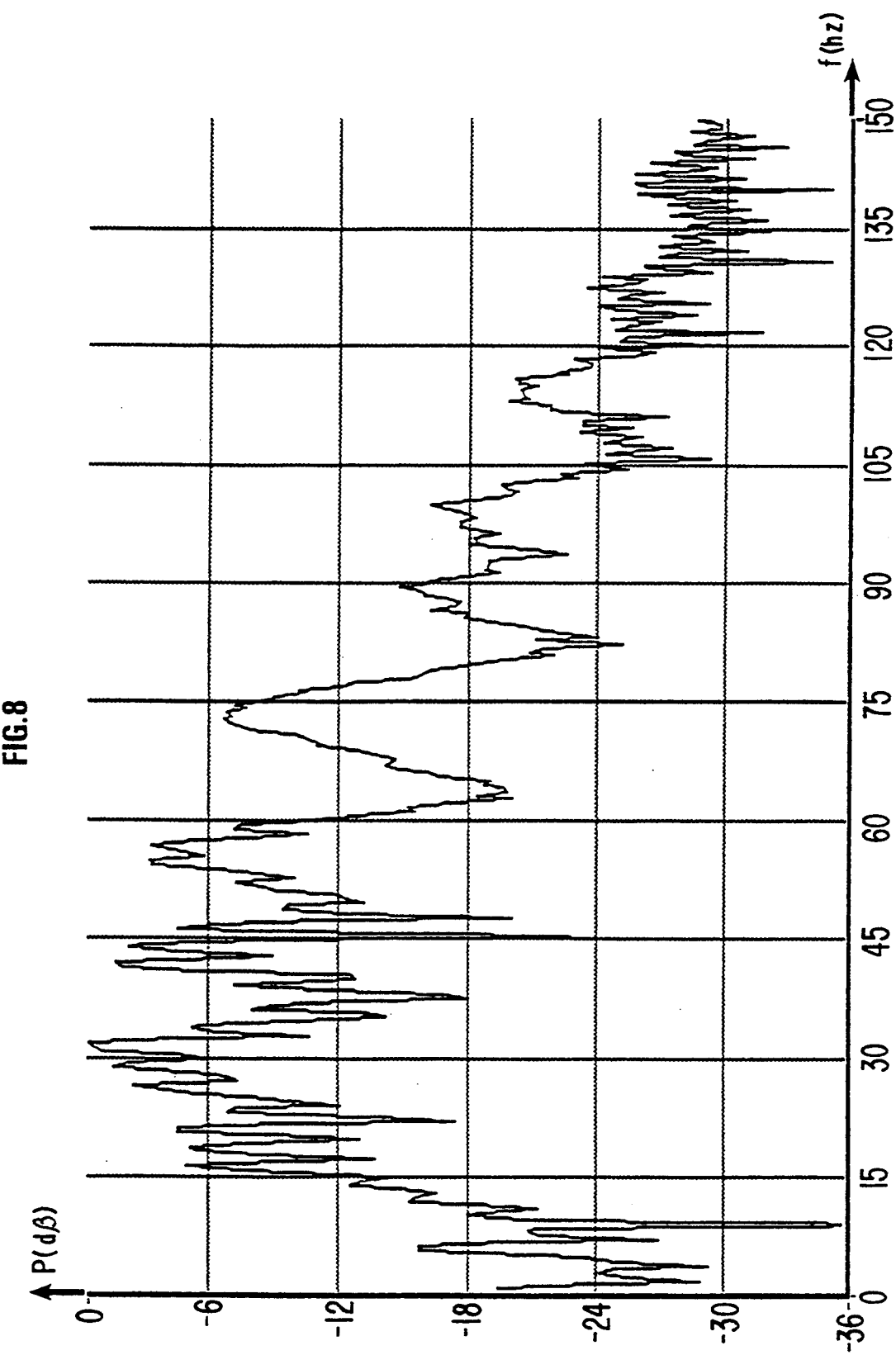

Comparing FIG. 8 (case of the bottomhole accelerometer representative of the jogs effectively emitted by the drill bit) with FIG. 7 (accelerometer at the head of the string) shows that the drill string intensifies the frequencies below 15 Hz and attenuates the higher frequencies between 35 and 60 Hz for example.

Much better results may even be obtained by modifying the previous seismic transmission-reception system so as to limit better the zone of transmission to the formations of the jogs created by preventing the whole of the drill string from vibrating. To that effect, damping means 21 adapted for limiting the propagation of the jogs towards the upper part thereof are interposed on the string.

Shock absorbers are well-known in the technique but they are commonly used only for reasons linked to the drilling activity. The purpose of these absorbers is for example to increase the life of the bit or to control better possible drilling deviations.

In the method according to the invention, shock absorbers are for example used to limit the propagation of longitudinal vibrations towards the surface and to obtain a jog source which is better localized at the level of the bit. Absorbers adapted for working under compression may be interposed close to the string base. In order to improve the efficiency thereof, shock absorbers more adapted for working under traction may be interposed higher on the string.

Attenuation means designed for absorbing preferably the frequency band concerning seismologists, ranging for example between 10 and 150 Hz for seismic prospecting between the well and the surface, and possibly higher frequencies for seismic prospecting between wells, are preferably selected.

These damping means prevent the parasitic vibrations due to resonances of the string or to the legs of the surface rig from being imparted to the formations and thereby from disturbing the seismic recordings being achieved. The refracted arrivals AR visible in FIGS. 3 to 6 are minimized thereby.

An additional improvement of the method according to the invention consists in modifying the frequency spectrum of the jogs imparted to the formations through a modification in the drill string. This is achieved by interposing on the string, in selected places, elements likely to resound in the seismic frequency band. This is particularly the case of drill collars which act as acoustic resonators and emit a fundamental frequency and harmonics which contribute to widening the frequency spectrum of the source. For the purposes of the method according to the invention, elements with different acoustic impedances are interposed between the drill collars, in the most favourable places, so as to create reflections and to favour certain useful resonances generated by the drill collars.

The selection of the various attenuating or resonant elements mentioned previously and their specific parameters may be modeled and determined by a computer provided with a specialized software to obtain an operational drill string perfectly efficient for drilling a well and, at the same time, optimized for a seismic function.

The seismic energy produced by the drill bit may sometimes be insufficient. The cause may be permanent and due to the bit used. It may also sometimes stem from the nature of the layers crossed by the tool, which are too soft. In this case, a drill bit of a well-known type, adapted for generating impacts at the hole bottom by order of the surface station, transmitted by means of transmission line 4, is preferably used. It is also possible to use a bottomhole assembly including a vibrating source such as that described in patent application EN.92/04,052 filed by the applicant.

Apart from its applications for achieving one or several-dimensional imagery of belowground seismic reflectors, the method according to the invention may also be applied to facilitate drilling operations or to obtain various information on the nature of the formations crossed. The follow-up, on the records, of particular seismic events may, by correlation, give information on the rate of propagation of the waves, as may be done by a specialized logging device of the sonic type, and allow a velocity log to be established thereby. Precise measurement of the direct transit times between the hole bottom and the sensors also provides information on the location and the rate of penetration of the drill bit. The form or "signature" of the jogs produced by the bit being perfectly known as it is measured at the well bottom, the method described may also be used to characterize the rock crossed and to diagnose the time when the drill bit is worn and needs to be changed.

Instead of a rigid string equipped with a transmission line as described previously, the method may be implemented by using as a seismic source a drill bit driven by downhole motors and connected to the surface by a continuous string made up of flexible tubes unwound from storage drums (coiled tubing) or hoses. In this case, the direct link between the bottomhole sensors 7 and the surface station is achieved more simply by a cable integrated in the continuous string.

Embodiments of the method have been described in which a direct transmission in real time of the signals received by bottomhole sensors 7 is preferably used to perform correlation operations with the seismic records.

However, without departing from the scope of the invention, the bottomhole module may be provided with storage means for the signals representative of the jogs of the bit and a delayed transmission of these signals to the surface station may be achieved provided that a common reference instant allowing the correlation operations mentioned above to be achieved is precisely established.

We claim:

1. A method for performing seismic prospecting operations in a formation by using the jogs generated by a drill bit connected to a tubular string at the base of a well drilled through the formation, comprising setting an array of seismic sensors in contact with the formation and connected to a control and acquisition station for acquiring and recording the seismic signals coming from the formation, also comprising detecting, in the vicinity of the drill bit, reference signals representative of the jogs generated by the bit and imparted to the formation, transmitting them to said control and acquisition station and performing operations of processing of the seismic signals received.

2. A method as claimed in claim 1, wherein said processing operations comprise correlating the seismic signals picked up and said reference signals.

3. A method as claimed in claim 2, wherein the reference signals being representative of components of the jogs generated by the drill bit along at least two axes, and the array of seismic sensors including sensitive elements for picking up components of the seismic signals along at least two axes, the jog components are correlated respectively with the components of the signals received.

4. A method as claimed in claim 1, wherein the transmission of said reference signals is achieved by means of a material transmission channel arranged along the tubular string.

5. A method as claimed in claim 1, comprising using decoupling means for attenuating the direct propagation, along the tubular string, of the jogs generated by the drill bit.

6. A method as claimed in claim 5, wherein decoupling means including string elements provided with elastic shock absorption means are used.

7. A method as claimed in claim 6, wherein string elements provided with elastic means adapted for working under compression and arranged in the vicinity of the drill bit are used, the elastic means being adapted for damping mainly the vibrations whose frequencies are contained in a frequency band useful for seismic prospecting.

8. A method as claimed in claim 6, wherein string elements provided with elastic means adapted for working under tension and arranged at a distance from the drill bit are used, the elastic means being adapted for damping mainly the vibrations whose frequencies are contained in a frequency band useful for seismic prospecting.

9. A method as claimed in claim 1, comprising using means interposed on the tubular string in the vicinity of the drill bit for modifying the frequency spectrum emitted thereby.

10. A method as claimed in claim 1, comprising intensifying on order the jogs generated during drilling.

11. A method as claimed in claim 1, comprising analyzing directly the reference signals so as to determine the nature of the rocks crossed by the drill bit.

12. A method as claimed in claim 1, comprising following up the seismic events detected by recording the seismic signals received and determining the variations in the rate of propagation of the seismic waves in the formations around the well.

13. A method as claimed in claim 1, comprising analyzing the reference signals to determine the evolution in time of the condition of the drill bit.

14. A device for performing seismic prospecting operations in a formation by using the jogs generated by a drill bit connected to a tubular string at the base of a well drilled through the formation, comprising an array of seismic sensors for receiving seismic waves coming from the formation, a control and acquisition station for acquiring and recording the seismic signals received by said seismic sensors and coming from the formation, also comprising sensing means arranged in the vicinity of the drill bit to produce reference signals representative of the jogs generated by the drill bit and imparted to the formation, means for transmitting said reference signals to said control and acquisition station which includes signal processing means.

15. A device as claimed in claim 14, wherein the control and acquisition station includes means for correlating the reference signals with the seismic signals and for recording the correlations obtained.

16. A device as claimed in claim 14, wherein the sensing means including first elements sensitive to the components of the jogs along at least two axes and the seismic sensors including second elements sensitive to the components of the seismic signals along at least two axes, said correlation means are adapted for performing correlations between the components picked up respectively by the first and the second sensitive elements.

17. A device as claimed in claim 14, including at least one material transmission channel arranged along the tubular string for connecting directly said sensing means to the control and acquisition station.

18. A device as claimed in claim 17, including decoupling means for attenuating the direct propagation, along the tubular string, of the jogs generated by the drill bit.

19. A device as claimed in claim 18, wherein the decoupling means include string elements provided with elastic shock absorption means.

20. A device as claimed in claim 19, wherein the string elements are provided with elastic means adapted for working under compression and are arranged in the vicinity of the drill bit, the elastic means being adapted for damping mainly the vibrations whose frequencies are contained in a frequency band useful for seismic prospecting.

21. A device as claimed in claim 19, wherein the string elements are provided with elastic means adapted for working under tension and are arranged at a distance from the drill bit, the elastic means being adapted for damping mainly the vibrations whose frequencies are contained in a frequency band useful for seismic prospecting.

22. A device as claimed claim 14, comprising means interposed on the tubular string in the vicinity of the drill bit for modifying the frequency spectrum emitted thereby.

23. A device as claimed in claim 22, wherein the means for modifying the frequency spectrum include resonant elements likely to resound at frequencies contained in a frequency band useful for seismic prospecting, such as drill collars.

24. A device as claimed in claim 23, including acoustic discontinuity elements with different acoustic impedances, so as to create reflections and to intensify the resonances generated by the resonant elements in a frequency band useful for seismic prospecting.

25. A device as claimed in claim 14, including a drill bit provided with means for intensifying at will the jogs produced, said means being controlled from the surface through transmission channel.

26. A device as claimed in claim 25, including a percussion bit which may be controlled by means of said transmission channel.

27. A device as claimed in claim 26, including a drill bit combined with a source of acoustic waves which may be controlled by means of said transmission channel.

* * * * *